United States Patent
Phelps

(10) Patent No.: US 7,742,055 B2
(45) Date of Patent: Jun. 22, 2010

(54) METHOD FOR PRODUCING THREE-DIMENSIONAL VIEWS USING A BRIGHTNESS CONTROL

(75) Inventor: Nicholas Phelps, Paris (FR)

(73) Assignee: E-On Software, Paris (FR)

( * ) Notice: Subject to any disclaimer, the term of this patent is extended or adjusted under 35 U.S.C. 154(b) by 479 days.

(21) Appl. No.: 11/760,205

(22) Filed: Jun. 8, 2007

(65) Prior Publication Data

US 2007/0291033 A1 Dec. 20, 2007

(30) Foreign Application Priority Data

Jun. 8, 2006 (FR) .................................. 06 05108

(51) Int. Cl.
- *G09G 5/00* (2006.01)
- *G09G 5/02* (2006.01)
- *H04N 5/57* (2006.01)
- *G06K 9/40* (2006.01)
- *G06K 9/32* (2006.01)
- *G06T 15/50* (2006.01)
- *G06T 17/00* (2006.01)

(52) U.S. Cl. ........................ 345/581; 345/426; 345/428; 345/586; 345/606; 348/602; 348/687; 382/254; 382/274; 382/300

(58) Field of Classification Search ......... 345/418–419, 345/426, 428, 581, 586, 606, 619, 639, 643, 345/673, 207, 48, 77; 348/602, 687; 358/509–510, 358/516–520, 525, 537; 382/254, 274, 276, 382/300
See application file for complete search history.

(56) References Cited

U.S. PATENT DOCUMENTS

| | | | |
|---|---|---|---|
| 4,975,970 A | 12/1990 | Zettel et al. | |
| 6,097,837 A | 8/2000 | Cok | |
| 6,278,436 B1 * | 8/2001 | Hosoi et al. | 345/30 |
| 2003/0081141 A1 * | 5/2003 | Mazzapica | 348/362 |
| 2004/0233321 A1 * | 11/2004 | Jung et al. | 348/362 |
| 2006/0227073 A1 * | 10/2006 | Okano et al. | 345/60 |
| 2007/0097321 A1 * | 5/2007 | Whitehead et al. | 353/30 |
| 2008/0297591 A1 * | 12/2008 | Aarts et al. | 348/51 |
| 2009/0066943 A1 * | 3/2009 | Uto et al. | 356/237.5 |

FOREIGN PATENT DOCUMENTS

JP 10319471 A * 5/1997
WO WO 96/30871 10/1996

OTHER PUBLICATIONS

"Adobe Photoshop 5.0 Limited Edition—User Guide", 1998, Adobe Systems Inc., U.S.A., XP-002414558, pp. 67-89.

* cited by examiner

*Primary Examiner*—Wesner Sajous
(74) *Attorney, Agent, or Firm*—Patterson Thuente Christensen Pedersen, P.A.

(57) ABSTRACT

A process for creating three-dimensional or relief views with the help of software running on a computer system for adjusting brightness of a scene comprising a plurality of pixels includes:
  determining a representative brightness of at least one predetermined area of the scene based on brightness of each pixel of the at least one predetermined area;
  comparing the average brightness to a reference value; and
  correcting the brightness of at least a portion of the scene in accordance with a result of the comparison.

14 Claims, 1 Drawing Sheet

METHOD FOR PRODUCING THREE-DIMENSIONAL VIEWS USING A BRIGHTNESS CONTROL

RELATED APPLICATION

The present application claims priority to French Application No. 06 05108 filed Jun. 8, 2006, which is incorporated by reference herein in its entirety.

FIELD OF THE INVENTION

The invention relates generally to image and video production and, more particularly, to producing three-dimensional (3D) or relief views, such as views produced by arranging elements one after the other during the production of a scene.

SUMMARY OF THE INVENTION

One aspect of the invention is directed to a computer system and software intended to produce 3D views of indoor and outdoor scenes automatically and in a user-friendly manner. This software, produced and distributed by the applicant, is a creative tool that is used specifically by amateurs and professionals, especially architects, landscape architects, graphic artists and computer-generated image creators, particularly for movies and television.

In software that creates 3D views, it is expected that there will be a light source such as the sun for an outside scene or an artificial source for an indoor scene, whether the light source is visible or not in the photo or scene.

Notably, the inventors have recognized that if a created scene does not have satisfactory brightness (that is, it is either too bright or too dark), a manual correction must be made, which is never easy, even with software with satisfactory usability.

DETAILED DESCRIPTION OF THE PREFERRED EMBODIMENTS

Figure 1:
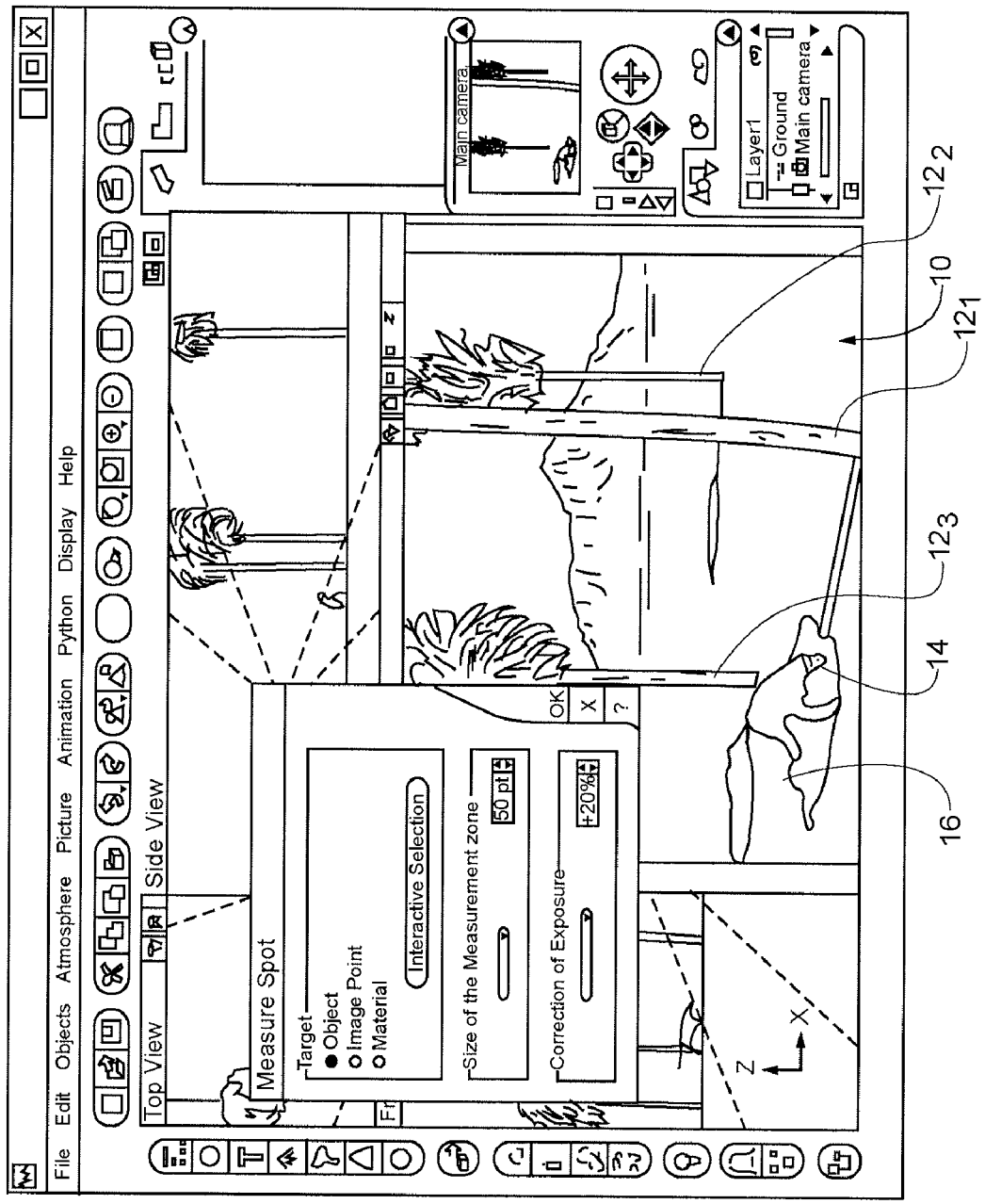
FIG. 1 is a screen shot view illustrating one embodiment of the invention in which a 3D image can be created artificially from separate elements.

One aspect of the invention aims to permit easy brightness adjustment of artificially-created 3D scenes.

By pixel brightness, we mean the brightness of a point or set of points of the 3D scene, which contributes to the value of a pixel in the final image representing the 3D scene. This point or set of points forms one or more surfaces in the 3D scene. The brightness of a point in the 3D scene corresponds to the amount of light received at that point.

The evaluation of that quantity of light is made, for example, on the basis of a numerical calculation. This numerical calculation may involve different parameters, for example, those in the group that includes: placement of one or more light sources in the scene, an intensity of one or more light sources, an absorption coefficient of the material that comprises the object of which the point is a part, the pixel value.

These different parameters will permit the lighting environment of a point in the 3D scene to be determined, as well as the amount of light that it receives.

Moreover, knowing the amount of light received at one point provides information on the quantity of light received at nearby points.

One example of a process according to one aspect of the invention includes the following steps for adjusting the brightness of the view:

determine the average brightness of one or more predetermined areas of the scene based on the brightness of each pixel of the area or several predetermined areas of the artificially-created scene.

compare this average brightness to a reference value and correct the brightness of the entire scene or of at least one area in accordance with the results of the comparison.

The notion of pixel brightness here must be understood in the previously defined sense.

For example, if the average brightness is less than the reference value, the correction involves increasing the brightness of each pixel of the image so that the average, following correction, corresponds to the reference value. Similarly, if the average brightness surpasses the reference value, decrease the brightness of each pixel according to a factor which permits an average value corresponding to the reference value to be obtained following correction.

The process may also be easily implemented with a simple addition to the existing software. It allows views which automatically have satisfactory brightness to be obtained. In fact, for a computer-generated image, as opposed to a photographic scene, in the course of being produced, there is direct access to the quantity of light received by each pixel, while in photography; the camera taking the photos has access only to the light reflected by the object or the scene photographed. Moreover, to quantify the brightness of a scene or an object, a camera uses a measuring device that does not have access to the brightness of each pixel but to the average value of the brightness reaching a sensor, while with a computer-generated image, there is access to the brightness of each pixel.

Thus, in this new process, more complete information is available for controlling luminosity than in conventional processes. In fact, having access to the quantity of light received at each point of the 3D scene allows more information to be obtained than when there is access only to the quantity of light reflected by this point. In fact, the quantity of light reflected varies (e.g., according to the material of the object and its reflective capacities), which is not the case with the quantity of light received.

Each area includes at least one pixel. One area may be based on the entire image.

During production, to obtain the average brightness, each pixel's brightness is weighted by at least one pre-selected parameter (e.g., one chosen from the group including the position of the pixel in the image, the distance from the pixel to the camera or virtual camera(s), the clarity of this pixel). In particular, greater weight may be given to the pixel brightness in the foreground and/or in a central part of the image and/or pixels of greater clarity.

To obtain the average brightness of an area or several areas of the image, add the individual luminosities weighted by each of the pixels.

Similarly, during production, weight the reference value by at least one parameter (e.g., a parameter that is a function of the average light of the area and/or the entire scene and/or or other areas).

During production, the addition of the values, possibly weighted, of the brightness of the various pixels that make up the scene is done as the pixels are created. As a variation, when the pixel brightness values are stored, the addition, that is, the determination of the average value, is made when the scene has been fully created.

Storing the luminosities of the area offers the possibility of treating each area individually; that is, the correction may be different from one area to another. So, the brightness of an area that is too dark may be increased without affecting the brightness of the other areas.

The automatic brightness adjustment may also be used for reducing the brilliance of the luminosities of the various zones of the image so that that this brilliance is compatible with that of the display screen utilized. In other words, image brightness is modified so that the highest brightness values correspond to those which can be displayed on the screen, and the lowest values also correspond to the lowest values that can be displayed on the screen.

During production, there is a method available for manually touching up the correction of the automatic exposure. To that effect, the user interface activated on the screen includes, for example, a cursor that permits increasing or decreasing the brightness of the image or an area.

During production, there is a type of manual command available that permits the users to choose an area in which they determine the average brightness, which is used to correct the brightness of the entire image after comparison with a reference value. In other words, it offers the possibility of creating an image by using an "exposure method" for a chosen area, similar to getting the exposure for a photographic image by a selective means sometimes called a "spot."

During production, it is an advantage that a computer-generated image is created in steps, and the automatic adjustment of brightness is refined at each step. In particular, during production, create a low-resolution image first; that is, including a number of pixels that is considerably less than the number in the final image to be created, and the automatic exposure adjustment is made based on that low-resolution image. So, the user can take the brightness of the image created into account and modify it if desired, based on the low-resolution image.

Then, production with an average-resolution image can continue until full resolution.

As a variation, the image is created in segments or bits of full resolution, and the brightness of the entire picture is corrected automatically after the creation of each segment or bit.

During production, each area corresponds to a set of pixels that have been given a similar preference, for which:

the average brightness comes between two predetermined values, and/or the surface shows specific properties, such as one or more predetermined colour(s) and/or a given surface state (e.g., bumps or unevenness and/or a specific reflection or transparency coefficient and/or the surface represents a predetermined element, such as an object or a person.

During production, the photo is part of a sequence of active images, and the brightness of the photo, or of at least an area, is corrected according to the brightness of a previous view of the sequence or an area of a previous photo of the sequence. Therefore, abrupt variations in brightness can be avoided. For example, if the previous comparison shows that it is necessary to double the brightness of the view or the area under consideration in comparison to the previous image, this increase cannot be made from one view to another but on a limited number of successive views.

FIG. 1 represents 3D image 10 created artificially from separate elements, such as trees 121, 122 and 123 and leopard 14.

Since leopard 14 is found in the shade 16 of tree 121, there is a danger that it will not very visible.

With this new process, to brighten leopard 14, the user points with the mouse, for example, at this element to select it and make an automatic correction to the exposure. Element 14 is selected in its entirety because it is a stored object for the image-creation software.

This element 14 then constitutes an area on which a selective or "spot" measurement of exposure is conducted. As explained above, this selective measurement allows brightness to be corrected for the entire image.

The invention claimed is:

1. A computer-readable storage medium having a program for creating three-dimensional or relief views, that when executed by a computer system, causes the computer system to perform a process for adjusting the brightness of a scene comprising a plurality of pixels, the process comprising:

determining a representative brightness of at least one predetermined area of the scene based on an amount of light received at each point, represented by a pixel, of the at least one predetermined area;

comparing the representative brightness to a reference value; and correcting the brightness of at least a portion of the scene according to a result of the comparison.

2. The process performed by the computer system according to claim 1, wherein the brightness of each pixel is evaluated by a numerical calculation involving at least one parameter selected from the group consisting of: placement of one or more light sources in the scene, an absorption coefficient of a material composing an object that is part of the scene, a value of the pixel; or any combination thereof.

3. The process performed by the computer system according to claim 1, wherein each of the at least one predetermined area includes at least one pixel.

4. The process performed by the computer system according to claim 1, wherein the at least one predetermined area is representative of an entire image.

5. The process performed by the computer system according to claim 1, wherein individual pixel luminosities are added together to obtain the representative brightness.

6. The process performed by the computer system according to claim 1, wherein to obtain the representative brightness, the brightness of each pixel is weighted by at least one pre-selected parameter selected from the group of parameters consisting of: a position of the pixel in the view, a distance from the pixel to a camera or a virtual camera, a clarity of the pixel, or any combination thereof.

7. The process performed by the computer system according to claim 1, wherein the reference value is weighted by at least one parameter that is a function of an average brightness of at least the at least one predetermined area.

8. The process performed by the computer system according to claim 1, wherein the three-dimensional or relief views are created in step-wise fashion, wherein a resolution of the three-dimensional or relief views increases from one step to the next and wherein the brightness is adjusted at least during an intermediate step therebetween.

9. The process performed by the computer system according to claim 1, wherein the three-dimensional or relief views are created in segments of full resolution and the brightness of the scene is corrected automatically after creation of each segment.

10. The process performed by the computer system according to claim 1, wherein a user interface is provided for manually touching up the three-dimensional or relief views following automatic correction of exposure of those views.

11. The process performed by the computer system to claim 1, wherein each area corresponds to a set of pixels, for which an average brightness exists between two predetermined values.

12. The process performed by the computer system according to claim 1, wherein the three-dimensional or relief views are part of a sequence of active images, and wherein the brightness of the at least one area is corrected according to the brightness of at least an area of a previous image of the sequence.

13. The process performed by the computer system according to claim 1, wherein each area corresponds to a set of pixels, for which a surface includes at least one characteristic selected from the group consisting of: a predetermined color, a presence of bumps; a presence of unevenness, a presence of a specific reflection, a transparency, or any combination thereof.

14. The process performed by the computer system according to claim 1, wherein each area corresponds to a set of pixels, for which a surface represents at least one predetermined element selected from the group consisting of: an object, a person, or any combination thereof.

* * * * *